United States Patent [19]

Trassl

[11] Patent Number: 4,500,066
[45] Date of Patent: Feb. 19, 1985

[54] ELECTRO-HYDRAULIC CONTROL ACTUATOR FOR TURBINE VALVES

[75] Inventor: Werner Trassl, Mülheim an der Ruhr, Fed. Rep. of Germany

[73] Assignee: Kraftwerk Union Aktiengesellschaft, Mülheim an der Ruhr, Fed. Rep. of Germany

[21] Appl. No.: 579,295

[22] Filed: Feb. 15, 1984

Related U.S. Application Data

[63] Continuation of Ser. No. 265,626, May 20, 1981, abandoned.

[30] Foreign Application Priority Data

May 22, 1980 [DE] Fed. Rep. of Germany ....... 3019602

[51] Int. Cl.³ ............................................. F16K 31/122
[52] U.S. Cl. ....................................... 251/26; 251/30; 60/404
[58] Field of Search .............. 251/25, 26, 30; 60/477, 60/481, 404, 405

[56] References Cited

U.S. PATENT DOCUMENTS

| | | | |
|---|---|---|---|
| 3,536,431 | 10/1970 | Lindquist | 251/26 |
| 3,682,436 | 8/1972 | Legille | 251/25 |
| 4,054,155 | 10/1977 | Hill | 251/25 |
| 4,190,130 | 2/1980 | Beck | 60/405 |

FOREIGN PATENT DOCUMENTS 2842846  12/1979  Fed. Rep. of Germany .

OTHER PUBLICATIONS

Pp. 37 and 39 of the "Siemens Zeitschrift 52".

Primary Examiner—Martin P. Schwadron
Assistant Examiner—James R. Shay
Attorney, Agent, or Firm—Herbert L. Lerner; Laurence A. Greenberg

[57] ABSTRACT

Electro-hydraulic control assembly for turbine valves, including electric control means, a shaft connected to a turbine valve, a valve housing and an integrated compact actuator unit disposed in the housing, the actuator unit including an electro-hydraulic converter connected to the electric control means, a hydraulic control cylinder being connected to the electro-hydraulic converter and having a control piston connected to the shaft, and a hydraulic supply system, the supply system including a fluid reservoir, a fluid pump being fed from the fluid reservoir and having a pressure side, an electric motor for driving the pump, and a hydraulic pressure accumulator connected to the pressure side of the pump.

4 Claims, 4 Drawing Figures

ELECTRO-HYDRAULIC CONTROL ACTUATOR FOR TURBINE VALVES

This application is a continuation of application Ser. No. 265,626, filed May 20, 1981 now abandoned.

The invention relates to an electro-hydraulic control actuator for turbine valves, especially for control, rapid closure and by-pass valves for steam turbines, with electrical control means, an electro-hydraulic converter, a hydraulic control cylinder having a control piston which is connected with a valve shaft, and a hydraulic supply system which includes a fluid being fed from a hydraulic fluid reservoir and driven by an electric motor, and a hydraulic pressure accumulator connected to the pressure side of the fluid pump.

A similar electro-hydraulic control actuator for the control valve of a steam turbine is known from German Published, Non-Prosecuted Application DE-OS No. 28 42 846. The control actuator shown therein is controlled by the control signals and the fast trigger signals of an electric turbine control. These electric signals are converted in the electro-hydraulic converter to hydraulic signals and are also hydraulically amplified thereby, so that the large forces are generated which are required for controlling the regulating valve with the aid of the hydraulic control cylinder. The hydraulic supply system is not further represented or described, except for mentioning a hydraulic pressure accumulator.

In general turbine construction practice, the energy supply of the control actuators of the individual turbine valves is always effected by a central, hydraulic supply system which includes a central hydraulic fluid reservoir, and usually several fluid-pumps which work against hydraulic pressure accumulators. Thus, for the connection of a control actuator with the central hydraulic supply system, it is always necessary to have at least two pipe lines, one pipe line admitting the hydraulic fluid under high pressure, and the other pipe line returning the hydraulic fluid to the central hydraulic fluid reservoir when the load is taken from the hydraulic components. To assure the reliable transfer of the hydraulic energy, these pipe lines require considerable expenditures for their construction, quality assurance and maintenance. Beside pressure peaks and pressure fluctuations in long pipe lines, the stresses caused by thermal expansions must also be especially taken into consideration. Finally, the danger of fire caused by a fracture of a pipe in the high temperature zone must be considered. In this connection, with respect to fire protection, hydraulic fluids which are hardly if at all flammable must be used. However, hydraulic fluids of this type which are hardly flammable are costly, and also require costly maintenance measures as compared to hydraulic fluids based on mineral oil, due to their low stability. The use of double-walled pipes for better fire protection also causes considerable problems with respect to installation and accessability.

It is accordingly an object of the invention to provide an electro-hydraulic control actuator for turbine valves which overcomes the hereinafore-mentioned disadvantages of the heretofore-known devices of this general type, and which on one hand satisfies the high requirements with respect to control force and control speed, and on the other hand avoids the problems connected with the transfer of hydraulic energy.

With the foregoing and other objects in view there is provided, in accordance with the invention, an electro-hydraulic control assembly for turbine valves, especially for control, rapid closure, and by-pass valves of steam turbines, comprising electric control means, a shaft connected to a turbine valve, a valve housing and an integrated compact actuator unit disposed in the housing, the actuator unit including an electro-hydraulic converter connected to the electric control means, a hydraulic control cylinder being connected to the electro-hydraulic converter and having a control piston connected to the shaft, and a hydraulic supply system, the supply system including a fluid reservoir, a fluid pump being fed from the fluid reservoir and having a pressure side, an electric motor for driving the pump, and a hydraulic pressure accumulator connected to the pressure side of the pump.

By the integration of the hydraulic supply system into the control actuator, the hydraulic pipe lines previously required to admit the hydraulic fluid are not required, and the expenditures associated with these pipe lines are avoided. Only wire cables are required for the energy supply of the control actuator and the conduction of the control signals and rapid triggering signals. These cables do not create any problems with respect to transfer reliability or fire protection.

The use of an electro-hydraulic control actuator with the supply system integrated in the control actuator unit is already known in the field of railroad signal technology. In the publication "Siemens Zeitschrift" 52 (1978), No. 1, pages 37 to 39, an electro-hydraulic gate actuator for a railway crossing protection installation is described. This device has its own hydraulic supply system including a hydraulic fluid reservoir and a fluid pump, and is only connected with the central control station by a current cable and a cable for the control signals. However, a transfer of this state of the art in the field of railroad signal technology to the construction of turbines is not possible without difficulties, even overlooking the non-existent technological connection between these fields. For example, in the electro-hydraulic gate-actuator, the integrated actuator unit can be directly mounted on its own base without diffuculty, while the control actuator of a turbine valve must be disposed in the restricted space in the valve housing. Therefore, the requirement for making a control actuator for a turbine valve as small and light as possible at first stands in the way of an integration of the hydraulic supply system into the actuator unit. Furthermore, the placing of the hydraulic supply system in the control actuator of the turbine valves is a completely new concept in the field of turbine construction, because in this field the electro-hydraulic control actuators were developed to always be oriented toward a central hydraulic supply.

In accordance with another feature of the invention, there are provided force storing spring means for quickly closing the turbine valve, and means for feeding hydraulic fluid from the hydraulic pressure accumulator to the hydraulic control cylinder for opening the turbine valve, the fluid pump having an output flow capacity being dimensioned for continuously replenishing leakage losses and for slowly filling the pressure accumulator.

By using these measures, the volume of the fluid pump and therefore the space requirement for placing it in the actuator unit is reduced to a minimum. The output flow of the fluid pump is only sufficient to cover the normal leakage losses, and to additionally effect a slow re-filling of the pressure actuator after the end of a control or closing motion of the valve. The storage volume of the pressure accumulator must therefore be large enough so that enough hydraulic fluid is available for a full opening motion of the valve, and for the sequentially occurring control motions required under the least favorable operating conditions.

In accordance with a further feature of the invention, the hydraulic control cylinder, fluid pump and hydraulic pressure accumulator have a given minimum structural size and volume being a function of a pre-specified control force of the fluid output and fluid pressure of the fluid pump, the storage volume of the pressure accumulator and the effective area of the control piston. This minimizing is made possible by the functional connection of the above-mentioned parameters. For example, the required control force is the result of the product of pump output pressure and effective area of the control piston. An increase of the pump output pressure within the limits possible for safe operation would lead on one hand to a reduction of the structural volumes of the hydraulic control cylinder and the hydraulic pressure accumulator, but on the other hand it would lead to an increase of the volume of the electric motor, if the latter is not compensated by the reduced fluid flow. Thus, by a suitable choice of the above-mentioned parameters the structural volume of the whole actuator unit can be minimized, and the limited space available at the turbine valve can thereby be utilized fully.

In accordance with an added feature of the invention, the hydraulic supply system is provided with another fluid pump being operable when the first-mentioned fluid pump is inoperative, and another electric motor for driving the other fluid pump. This measure increases the operating safety of the control actuator, however a certain increase of the size of the control actuator must be acceptable.

A further improvement of the operating safety of the control actuator can be achieved if, in accordance with a concomitant feature of the invention, the hydraulic pressure accumulator is subdivided into at least two part-accumulators each having a storage volume capable of supplying sufficient hydraulic fluid for operating the control cylinder alone.

Furthermore, in the embodiment, a higher preference is given to an increase of the operating safety versus minimizing the size of the whole actuator unit, a fact which makes the minimizing of the individual components even more important.

Other features which are considered as characteristic for the invention are set forth in the appended claims.

Although the invention is illustrated and described herein as embodied in an electro-hydraulic control actuator for turbine valves, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
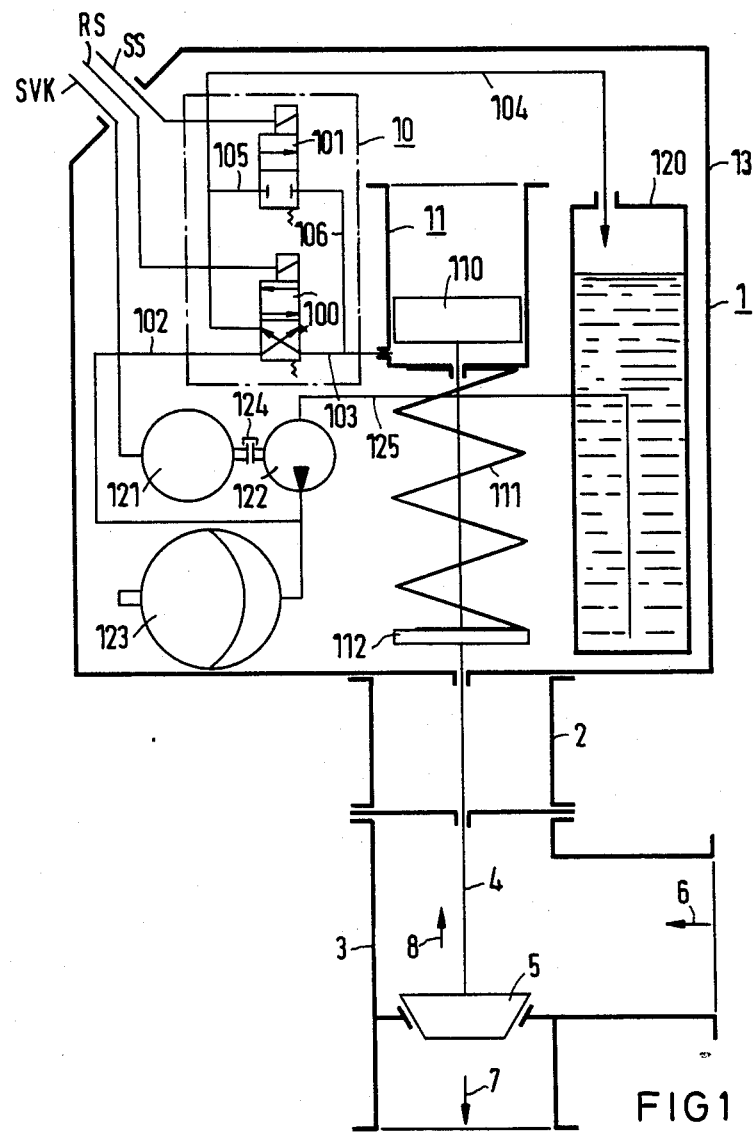
FIG. 1 is a greatly simplified schematic and diagrammatic representation of an electro-hydraulic control actuator of the invention.

Referring now to the figures of the drawing and first particularly to FIG. 1 thereof, there is seen an electro-hydraulic control actuator designated as a whole with reference numeral 1, which is combined with a turbine valve 3 through an intermediate structure 2. The turbine valve 3 is operated by the electro-hydraulic actuator through a connecting rod 4; the valve cone 5, shown in the closed position, being fastened to the lower end of the rod 4. The flow through the turbine valve 3, indicated by the arrows 6 and 7, is regulated by the corresponding raising of the connection rod 4 in the opening direction, indicated by arrow 8. The electro-hydraulic control actuator 1 essentially includes an electro-hydraulic converter 10, a hydraulic control cylinder 11 and a hydraulic supply system. The hydraulic supply system includes a fluid-pump 122 that is supplied from a hydraulic fluid reservoir 120 and driven by an electric motor 121, and also a hydraulic pressure accumulator 123 which is connected to the pressure side of the fluid pump.

All previously listed components are integrated to a compact actuating unit disposed at the turbine valve 3, so that the integration of the components is indicated in the diagrammatic view by a common housing 13.

The electro-hydraulic converter functions to convert the electric signals generated from a turbine control to hydraulic signals. For this purpose the embodiment shown includes a two-way valve 100 which is controlled by an electric control-signal RS, and an electric one-way valve 101 which is actuated by an electric trigger signal SS. The first inlet port of the two-way valve 100 is connected to the pressure side of the pump 122 and to the hydraulic pressure accumulator 123 over a line 102. The second inlet port of the two-way valve 100 is connected with the hydraulic control cylinder 11 by a line 103, while the third inlet port is connected to the hydraulic fluid reservoir 120 over an outflow line 104. The first port of the one-way valve 101 is connected to the outflow line 104 by a branch line 105, and the second port is connected over a branch line 106 and the line 103 to the hydraulic control cylinder 11. To open the turbine valve 3, the two-way valve 100 is set by a corresponding control signal RS, so that the space below a control piston 100 is filled with hydraulic fluid from the hydraulic pressure accumulator 123, and the valve cone 5 is moved in the opening direction 8 by the rod 4 which is connected to the control piston 110. During this opening motion a force storing spring 111 is tensioned at the same time. The spring is therefore arranged between the hydraulic control cylinder 11 and a plate 112, which is fastened to the connecting rod 4. To close the turbine valve 3, the two-way valve 100 is set by a corresponding control signal RS in such a manner, that the hydraulic fluid under the control piston 110 can flow off into the hydraulic fluid reservoir 120 over the outflow or drain line 104, and the spring force of the force storage spring 111 moves the control piston 110 and the valve cone 5 in the closing direction opposite to the arrow 8. In a corresponding manner for closing of the turbine valve 3 by a corresponding trigger signal SS, the one-way valve 101 is opened, so that the space below the control piston is relieved of pressure, and the forceful spring 111 can effect a rapid closing motion.

In the functional scheme of the electro-hydraulic control actuator 1 described and shown in FIG. 1, a configuration was chosen for the electro-hydraulic converter 10 which was as simple as possible. Since the control signals RS and the trigger signals SS, which have very low power levels, must be brought to a level of for example 10000 times higher for generation of strong control forces, the electro-hydraulic converter 10 can also include one or more hydraulic amplification stages.

For generating the required hydraulic auxiliary energy, electrical energy is supplied over a current supply cable SVK, is converted to mechanical energy in the electric motor 121, and finally the hydraulic fluid is sucked-in from the hydraulic fluid reservoir 120 by a pump 122, which is driven by the electric motor 121 through a clutch 124, and the fluid is transported into the hydraulic pressure accumulator 123. The maximal pressure of the filled hydraulic pressure accumulator 123 is, for example, 160 bar. In order to keep the size of the fluid pump 122 and the associated electric motor 121 as small as possible, the generated flow should only compensate for leakages occurring during operation, and should additionally have the capability of slowly filling the hydraulic pressure accumulator 123. This is achieved by suitably dimensioning the storage capability of the hydraulic pressure accumulator 123. The required supply of hydraulic fluid for the complete opening of the turbine valve 3, and for control motions which happen in rapid succession, must be completely furnished from the hydraulic pressure accumulator 123.

Figure 2:
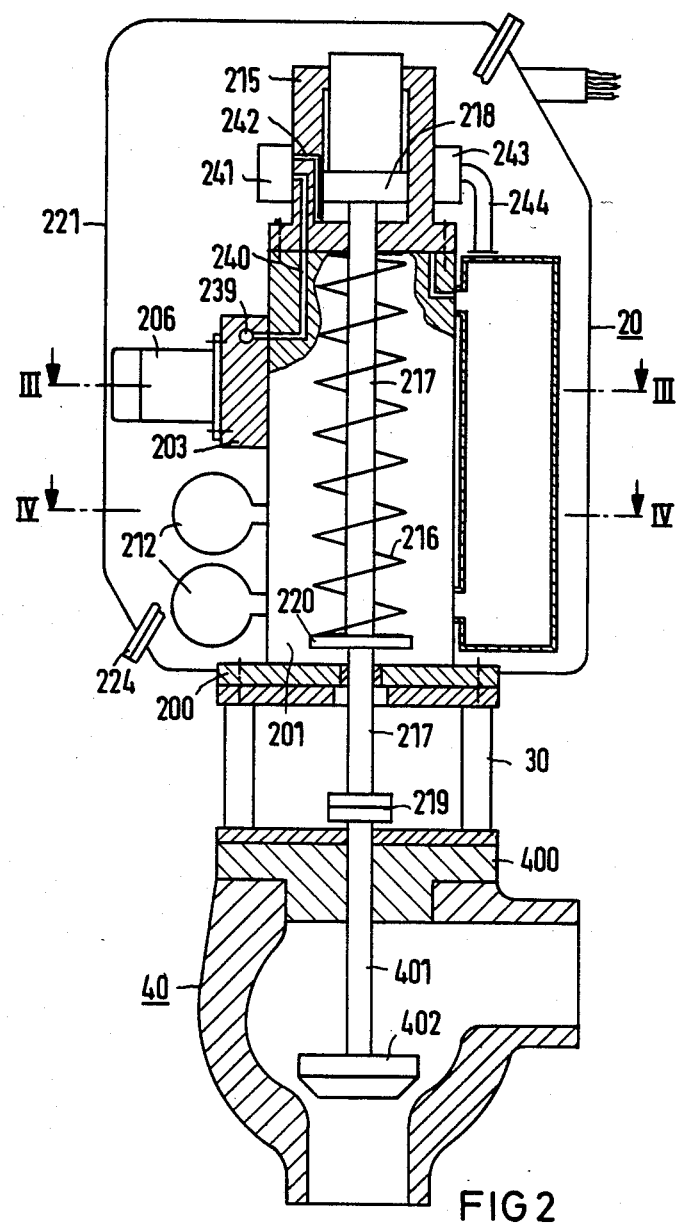
FIG. 2 is a diagrammatic longitudinal-sectional view, partly broken away through the electro-hydraulic actuator for the control valve of a steam turbine.
Figure 3:
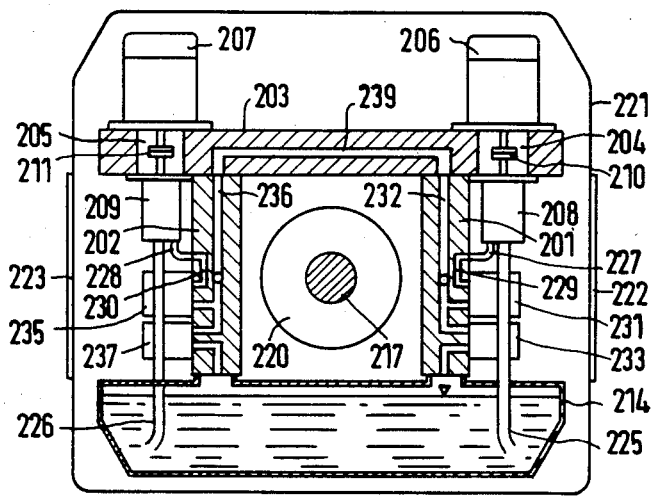
FIG. 3 is a cross-sectional view taken along line III—III in FIG. 2 in the direction of the arrows.
Figure 4:
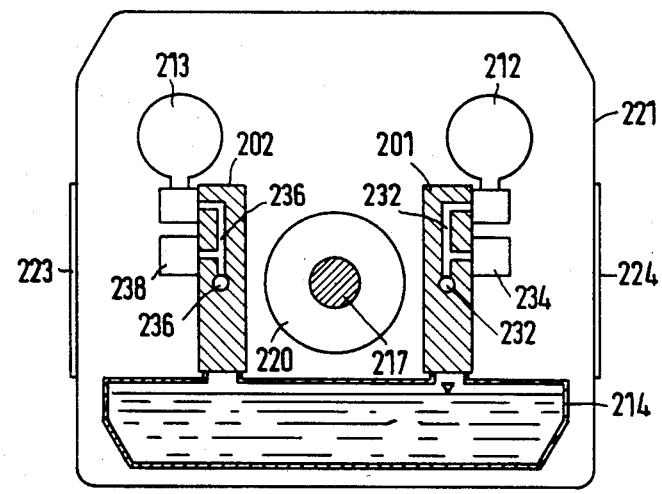
FIG. 4 is a view similar to FIG. 3, taken along the line IV—IV in FIG. 2, in the direction of the arrows.

FIGS. 2, 3 and 4 show, in a simplified representation, the construction of an electro-hydraulic actuator for the control valve of a steam turbine. The whole electro-hydraulic control actuator is designated in these figures with reference numeral 20, and it is carried by a column-structure 30, which in turn is fastened to the valve cover 400 of the control valve 40. A support structure for the electro-hydraulic control actuator 20 is present in the form of a base plate 200, two support plates 201 and 202, which are disposed vertically and spaced apart from each other on the base plate 200, and an end plate 203 which is fastened on the end of the support plates 201 and 202. Bores 204, 205 are provided in the sideward extending regions of the endplate 203, so that electric motors 206, 207, and fluid-pumps 208, 209 can be fastened by suitable flanges from the outside and inside, respectively. The clutch 210 for connecting the electric motor 206 with the associated fluid-pump 208 is therefore disposed within the bore 204, and the clutch 211 for connecting the electric motor 207 with the associated fluid-pump 209 is similarly disposed within the bore 205.

In the region between the end plate 203 and the base plate 200, there are disposed a total of four hydraulic pressure accumulators 212, 213. Two hydraulic pressure accumulators 212 are fastened with flanges to the side of the support plate 201, and two hydraulic pressure accumulators 213 are fastened with flanges to the side of the support plate 202. The two carrier or support plates 201 and 202 also serve for securing a hydraulic fluid reservoir 214 and a hydraulic control cylinder 215, in such a manner that the hydraulic fluid reservoir 214 is fastened at the sides opposite to the end plate 203, while the hydraulic control cylinder 215 is fastened at the ends opposite to the base plate 200. Because of this arrangement, the limited space between the two support plates 201 and 202, the end plate 203 and the hydraulic fluid reservoir 214 can be used for locating the power-spring 216 and the guide rod 217 of the hydraulic control cylinder 215. The guide rod 217 connects a control piston 218 of the hydraulic control cylinder 215 through a clutch 219 with a valve shaft 401, which carries at its end a valve cone 402 of the control valve 40. The power-spring 216 is disposed on the guide rod 217 between a plate 220, which is fastened to the guide rod 217, and the hydraulic control cylinder 215, in such a manner that it is tensioned by a suitable lifting motion of the control piston 218 when the control valve 40 is opened, and is capable of closing the control valve 40 again after the pressure is taken from control piston 218. A housing 221 is provided for covering the electro-hydraulic control actuator 20 which is fastened to the base plate 200, in such a way that the housing has two access covers 222 and 223 at its sides, and is partioned by a diagonal flange 224. The housing 221 serves the purpose of catching hydraulic fluid which may escape during installation and maintenance work, and to therefore exclude from the beginning of assembly the danger of a fire occuring because of the uncontrolled leakage of hydraulic fluid. For removal of heat generated by losses in the electro-hydraulic actuator 20, cooling air can be conducted by a non-illustrated blower between the housing 221 and the hydraulic fluid reservoir 214, which may possibly have cooling-ribs.

The two carrier plates 201 and 202 and the end plate 203, beside their above-described function as support structure, also have the additional purpose of connecting the elements which are fastened to them with each other, so that connecting pipes can be omitted to a great extent. Both fluid-pumps 208 and 209 are connected at their suction sides to the hydraulic fluid reservoir 214 through suction lines 225, 226, respectively, while at their pressure sides a connection with channels 229, 230 of the side plates 201, 202 is made by short pipe sections or arches 227, 228, respectively. The channel 229 in the support plate 201 leads to a check valve 231 which is connected to a pressure limiting valve 233 of the fluid pump 208, to the hydraulic pressure accumulators 212 and to their limiting valves 234, by a channel 232 which divides into several branches. In the same manner, the channel 230 in support plate 202 leads to a check valve 235, which is connected by a channel 236 with several branches to a pressure limiting valve 237 of the fluid pump 209, to the hydraulic pressure accumulators 213, and to their pressure limiting valves 238. The pressure-limiting valves 233 and 237 are connected with the hydraulic fluid reservoir 214 by channels which are not further described. The pressure limiting valves 234 and 238 are also connected with the hydraulic fluid reservoir 214 by channels which are not shown. A cross-connection channel 239 in the end plate 203 serves for the cross-connection of the fluid-pumps 208 and 209 and the hydraulic pressure accumulators 212 and 213. In addition to the cross channel 239, there are also provided branches corresponding to the channels 232, 236 in the support plates 201 and 202. The cross-connection channel 239 in conjunction with another channel 240 in the support plate 201 provides the connection between the hydraulic pressure accumulators 212 and 213 and the hydraulic control cylinder 215. The channel 240 leads to a first module 241 of an electro-hydraulic converter; the module 241 being connected by a channel 242 with a chamber below the control piston. A second module 243 at the control cylinder 215 of the non-illustrated electro-hydraulic converter is connected through a drainline 244 with the hydraulic fluid reservoir 214, so that when the control valve 40 is closed, the hydraulic fluid can be removed from the space below the control piston 218 in a manner which is not further shown in FIGS. 2-4 but is shown in FIG. 1.

In the typical embodiment of an electro-hydraulic actuator shown in FIGS. 2, 3 and 4, an extremely compact construction of the drive unit is made possible by the support structure including plates which simultaneously combine the supporting and connecting functions. In this way the easy ability to maintain the individual components is assured by the well organized and easily accessible arrangement of the individual components. Furthermore, a highly reliable operation is obtained with respect to the fluid pumps and hydraulic pressure accumulators by the symmetrical and redundant arrangement of the actuating unit.

There is claimed:

1. Electro-hydraulic control actuator assembly for turbine valves, comprising a turbine valve having a valve cone being movable between an open and a closed position of said valve, a shaft connected to said valve cone, a valve housing, an integrated compact actuator unit disposed on said valve housing and combined with said valve, said actuator unit including an electro-hydraulic converter, a hydraulic control cylinder being connected to said electro-hydraulic converter and having a control piston connected to said shaft for moving said valve cone to said open position of said valve, a power spring connected to said shaft for absorbing movement of said valve cone into said open position of said valve and for resetting said valve cone for rapid closing be spring loading, and a hydraulic fluid supply system, said supply system including a hydraulic fluid reservoir, first and second fluid pumps each being fed from said fluid reservoir and each having a pressure side, first and second electric motors each driving a respective one of said pumps, a hydraulic pressure accumulator subdivided into at least two part-accumulators, and piping disposed in said actuator unit connecting said part-accumulators to said pressure side of said pumps and to said hydraulic control cylinder for providing hydraulic fluid for an opening motion of said valve, each of said part-accumulators having a hydraulic fluid storage volume sufficient for providing hydraulic fluid for at least one full opening motion of said valve even if one of said part-accumulators is inoperative, said fluid pump having a flow capacity being dimensioned for continuously replenishing leakage losses and for slowly filling said pressure accumulator, and said second fluid pump being operable when said first fluid pump is inoperative.

2. Electro-hydraulic control assembly according to claim 1, wherein said valve is a control valve.

3. Electro-hydraulic control assembly according to claim 1, wherein said valve is a rapid-closing valve.

4. Electro-hydraulic control assembly according to claim 1, wherein said valve is a bypass valve.

* * * * *